(12) United States Patent
Schoenberg

(10) Patent No.: US 9,747,519 B2
(45) Date of Patent: Aug. 29, 2017

(54) CLASSIFYING AMBIGUOUS IMAGE DATA

(71) Applicant: MICROSOFT TECHNOLOGY LICENSING, LLC, Redmond, WA (US)

(72) Inventor: Michael John Schoenberg, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 73 days.

(21) Appl. No.: 14/695,623

(22) Filed: Apr. 24, 2015

(65) Prior Publication Data

US 2016/0314373 A1    Oct. 27, 2016

(51) Int. Cl.
| G06K 9/62 | (2006.01) |
| G06K 9/46 | (2006.01) |
| G06K 9/52 | (2006.01) |
| G06K 9/00 | (2006.01) |
| G06T 7/50 | (2017.01) |

(52) U.S. Cl.
CPC ....... *G06K 9/6201* (2013.01); *G06K 9/00691* (2013.01); *G06K 9/46* (2013.01); *G06K 9/52* (2013.01); *G06T 7/50* (2017.01); *G06K 2009/4666* (2013.01)

(58) Field of Classification Search
CPC .......... G06K 9/52; G06K 9/46; G06K 9/6201; G06K 2009/4666; G06T 7/0051; G06T 7/11
USPC .......................................... 382/154, 195, 224
See application file for complete search history.

(56) References Cited

U.S. PATENT DOCUMENTS

| 6,300,958 B1 | 10/2001 | Mallet |
| 7,030,968 B2 | 4/2006 | D'Aligny et al. |
| 7,272,264 B2 | 9/2007 | ElShishiny et al. |
| 7,852,461 B2 | 12/2010 | Yahav |
| 8,675,182 B2 | 3/2014 | Bamji |
| 2011/0001799 A1 | 1/2011 | Rothenberger et al. |
| 2012/0287247 A1 | 11/2012 | Stenger et al. |
| 2014/0085622 A1 | 3/2014 | Wong |
| 2015/0116509 A1* | 4/2015 | Birkler ............... H04N 5/23293 348/207.1 |

OTHER PUBLICATIONS

McClure, et al. (Resolving depth measurement ambiguity with commercially available range imaging cameras), SPIE, pp. 1-12, 2010.*

(Continued)

*Primary Examiner* — Daniel Mariam
(74) *Attorney, Agent, or Firm* — Alleman Hall Creasman & Tuttle LLP

(57) ABSTRACT

Examples are disclosed herein that relate to classifying ambiguous data in an image. One example provides, on a computing device, a method of processing image data, the method comprising defining a contiguous area of ambiguous data in an image, determining a border surrounding the contiguous area, classifying the contiguous area as dark or far based on a characteristic of one or more pixels of the border, and for the classified contiguous area, processing one or more pixels of the contiguous area differently if the contiguous area is classified as far than if the contiguous area is classified as dark.

20 Claims, 9 Drawing Sheets

(56) References Cited

OTHER PUBLICATIONS

Trappenberg, et al. (A Classification scheme for applications with ambiguity data), IEEE, pp. 296-301, 2000.*

Chuang, et al., "Single Image Depth Estimation Based on Dark Channel Prior", In Proceedings of 9th International Conference on Information, Communications and Signal Processing, Dec. 10, 2013, 5 pages.

Tsiotsios, et al., "Backscatter Compensated Photometric Stereo with 3 Sources", In Proceedings of IEEE Conference on Computer Vision and Pattern Recognition, Jun. 23, 2014, pp. 4321-4328.

Shim, et al., "Recovering Translucent Objects using a Single Time-of-Flight Depth Camera", In Proceedings of IEEE Transactions on Circuits and Systems for Video Technology, Feb. 2, 2015, 14 pages.

Lefloch, et al., "Technical Foundation and Calibration Methods for Time-of-Flight Cameras", In Proceedings of Time-of-Flight and Depth Imaging. Sensors, Algorithms, and Applications, Sep. 23, 2013, 20 pages.

Lee, et al., "Discontinuity-Adaptive Depth Map Filtering for 3D View Generation", In Proceedings of the 2nd International Conference on Immersive Telecommunications, May 27, 2009, 6 pages.

Westberg, Michael, "Time of Flight Based Teat Detection", In Student thesis, Published on: May 5, 2009, 61 Pages.

Mu et al., "Complete 3D Model Reconstruction Using Two Types of Depth Sensors", In Proceedings of IEEE International Conference on Intelligent Computing and Intelligent Systems, vol. 1, Oct. 29, 2010, 5 pages.

Camplani, M. et al., "Accurate Depth-Color Scene Modeling for 3D Contents Generation with Low Cost Depth Cameras", In Proceedings of 19th IEEE International Conference on Image Processing (ICIP), Sep. 30, 2012, 4 pages.

Mallick, T. et al., "Characterizations of Noise in Kinect Depth Images: A Review", In IEEE Sensors Journal, vol. 14, Issue 6, Jun. 2014, 10 pages.

ISA European Patent Office, International Search Report and Written Opinion issued in PCT Application No. PCT/US2016/026075, Jun. 10, 2016, WIPO, 13 pages.

Yu, Y. et al., "A Shadow Repair Approach for Kinect Depth Maps," Proceedings of the 11th Asian Conference on Computer Vision (ACCV'12), Part IV, Springer LNCS 7727, Daejeon, Korean, Nov. 5, 2012, 12 pages.

IPEA European Patent Office, Second Written Opinion issued in PCT Application No. PCT/US2016/026075, dated Feb. 21, 2017, WIPO, 7 pages.

* cited by examiner

CLASSIFYING AMBIGUOUS IMAGE DATA

BACKGROUND

Imaging devices may be used to capture image data of surrounding environments for many different applications, including but not limited to visual communications, interactive entertainment, and security applications. Many different types of imaging devices may be utilized, including but not limited to two-dimensional and three-dimensional cameras utilizing various wavelengths of light (e.g. infrared and/or visible).

SUMMARY

Examples are disclosed herein that relate to classifying ambiguous data in an image. One example provides, on a computing device, a method of processing image data, the method comprising defining a contiguous area of ambiguous data in an image, determining a border surrounding the contiguous area, classifying the contiguous area as dark or far based on a characteristic of one or more pixels of the border, and for the classified contiguous area, processing one or more pixels of the contiguous area differently if the contiguous area is classified as far than if the contiguous area is classified as dark.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In some instances, image data acquired by an imaging device may be ambiguous, in that the image data may be interpreted in two or more ways by a computing device. As one example, a depth camera may provide unambiguous image data within a particular range of distances, but may provide ambiguous data outside of this range, as the camera may not be configured to image depths beyond a maximum threshold. Thus, objects in a scene that are beyond the maximum threshold will appear as dark in the resulting depth image. Likewise, objects that absorb light of the wavelength(s) being utilized for the depth imaging also may appear as dark in the depth image. Thus, in such cameras, difficulties can arise in distinguishing pixels outside of a depth imaging range (e.g. "far" pixels") from pixels that image dark objects in the scene ("dark" pixels). Various types of cameras, including but not limited to time-of-flight depth cameras, may experience these and potentially other ambiguities.

Accordingly, examples are disclosed herein that relate to disambiguating ambiguous pixels in image data. Briefly, the disclosed examples define a contiguous area of ambiguous data, such as the above-described dark-appearing data, in an image, and classify the contiguous area as one of multiple possible states (e.g. "dark" or "far") based on a characteristic of one or more pixels of a border surrounding the contiguous area. Once classified, the pixels of the ambiguous area may be processed based upon the determined classification.

Figure 1:
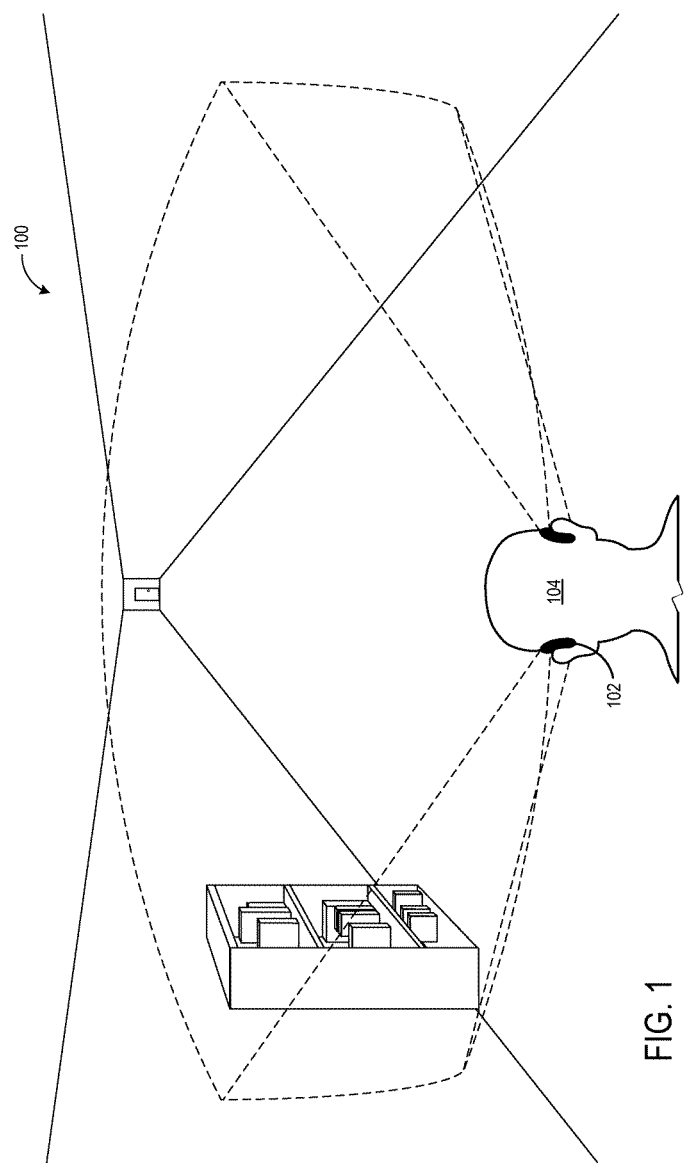
FIG. 1 shows an example depth imaging scenario.

FIG. 1 shows an example scenario 100 in which an imaging device 102 worn by a user 104 acquires an image of a long hallway. The imaging device 102 includes a depth camera for acquiring depth image data of the surrounding environment. The imaging device 102 is depicted as a head-mounted device, but the imaging methods disclosed herein may be implemented in any other suitable type of imaging device.

Figure 2:
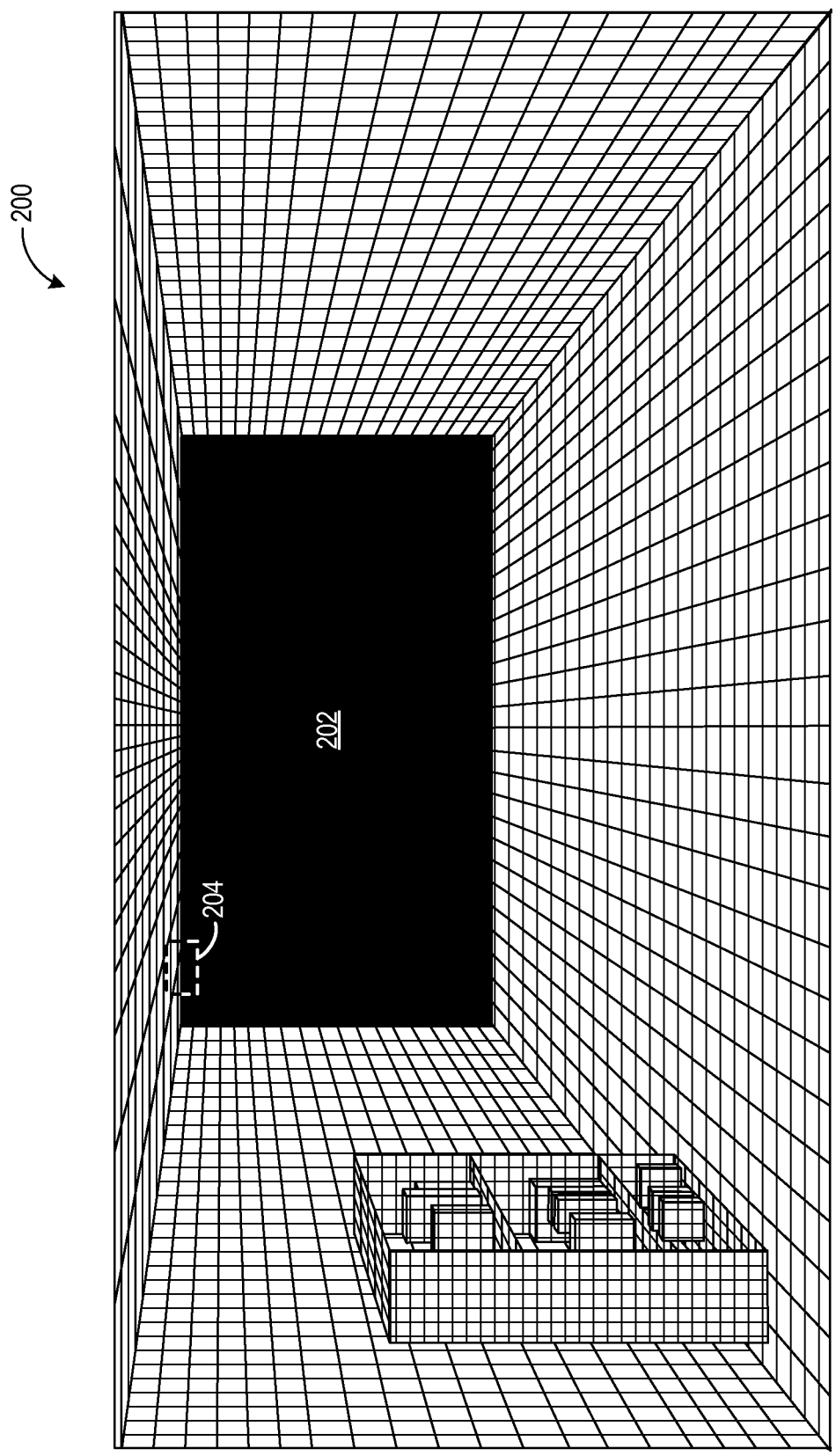
FIG. 2 schematically illustrates example depth data acquired in the scenario of FIG. 1.

As mentioned above, image data acquired by the imaging device 102 may include ambiguous data. For example, where a pixel has insufficient intensity to compute a depth value, it may be unclear whether the pixel should be classified as "far" or "dark." FIG. 2 shows depth image data in the form of an example three-dimensional mesh 200 constructed via depth data acquired in the scenario of FIG. 1. In FIGS. 1 and 2, walls of the hallway extend away from the depth camera past a maximum range of the depth camera. Thus, FIG. 2 depicts a contiguous area 202 of ambiguous data representing a portion of the scene that is outside of a maximum range of the depth camera. The data within area 202 may provide little or no indication to a computing device processing the data regarding whether the data represents "dark" or "far" pixels.

Thus, values of pixels in a border region around the ambiguous area may be considered by a computing device to help determine whether the ambiguous data is "dark" or "far." To locate the border region, the computing device may utilize a flood-fill approach by locating an ambiguous pixel lacking a depth value, identifying any immediately adjacent pixels also lacking depth values, and then repeating this process for each ambiguous pixel identified to form a contiguous region of pixels determined to be ambiguous. Such regions also may be referred to as connected components. It will be understood that an image may contain more than one ambiguous region; thus, the connected component determination may be performed for each area of ambiguous pixels in the image. Likewise, it will be understood that, in other examples, other approaches than a flood-fill approach may be used to define contiguous areas of ambiguous pixels.

Figure 3:
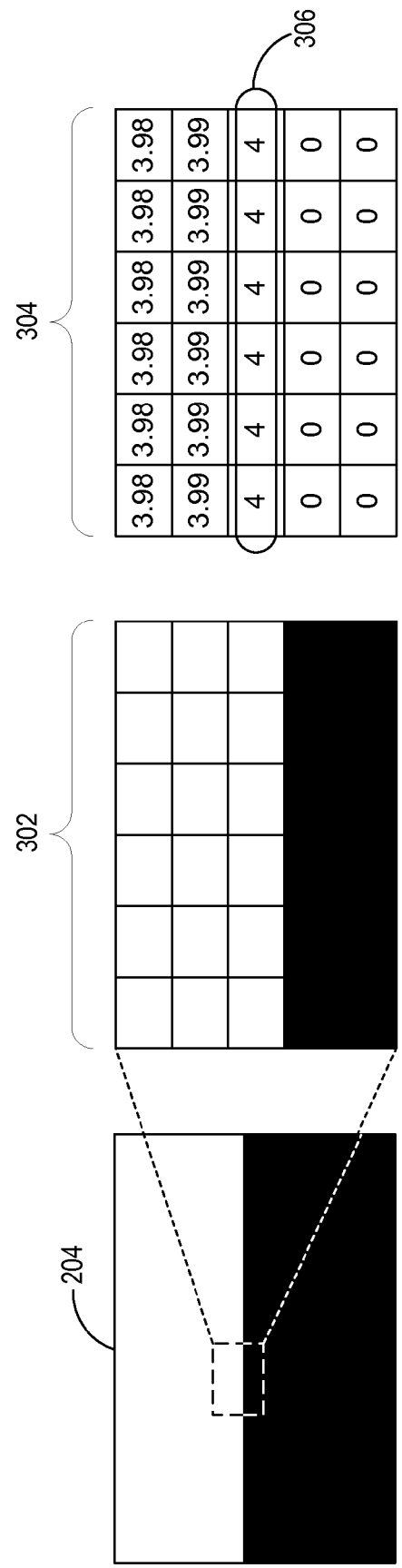
FIG. 3 schematically illustrates an example method of classifying ambiguous data in the depth data of FIG. 2.

For each contiguous area of ambiguous data defined, the computing device may determine a border surrounding the contiguous area, wherein the border comprises unambiguous pixels immediately adjacent to the contiguous area of ambiguous pixels. FIG. 2 shows a portion 204 of the border region of the three-dimensional mesh 200, and FIG. 3 shows a magnified portion 302. Example depth values for each pixel in the magnified portion 302 are represented in table 304. Ambiguous pixels are represented in this example by depth values of zero. As depicted in the table 304, border pixels 306 are those that have unambiguous depth data and that are immediately adjacent to the contiguous area of ambiguous pixels.

Once the border surrounding the contiguous area of ambiguous data has been determined, the computing device may then classify the contiguous area as "dark" or "far" based upon characteristic(s) of the border. Any suitable characteristics may be utilized in this classification. As one example, the computing device may be configured to determine whether each pixel of the border is within a threshold distance of a maximum depth value that represents the maximum range of the depth camera. In the example scenario of FIGS. 1-3, the depth camera may have a maximum range of four meters. The table 304 depicts the border pixels 306 as having unambiguous depth values of four meters. As the depicted border pixels are near (in this case at) the maximum depth value, this may indicate that the contiguous area is more likely to be "far" than "dark". Thus, the computing device may classify the contiguous area 202 as "far" by determining, for example, that a ratio of a number of pixels of the border 306 within the threshold distance of the maximum depth value to a total number of pixels of the border exceeds a threshold value. As another example, the computing device may classify the contiguous area 202 as "far" by determining that a ratio of a number of pixels of the border within the threshold distance of the maximum depth value to a unit area of the contiguous area (e.g. a total number of pixels of the contiguous area) exceeds a threshold value.

Alternatively or additionally, other characteristics of the border than the above-described ratios may be utilized. For example, a computing device may be configured to score each pixel of the border based on how close the depth value of that pixel is to the maximum depth value. In this manner, pixels closer to the maximum depth value are weighted more strongly than pixels relative to a pixel farther away from the maximum depth value. Thus, a weighted total score may be determined as a sum of the scores of the border pixels. The computing device then may classify the contiguous area as "far" by determining that the weighted total score exceeds a threshold score.

In some implementations, additional pixels other than the border pixels may be considered when classifying ambiguous pixels. For example, a computing device may be configured to determine gradients of pixels adjacent to the border pixels to aid in classifying ambiguous pixels. In such an example, the gradient of depth values along a direction orthogonal to the tangent of the contiguous area at that border pixel may be computed. A gradient that shows a depth increasing toward the maximum value as the contiguous ambiguous region is approached may indicate a potentially higher likelihood that the ambiguous region is "far" rather than "dark." For example, the table 304 illustrates data that may show such a gradient. It will be understood that any suitable number of adjacent pixels may be considered.

Figure 4:
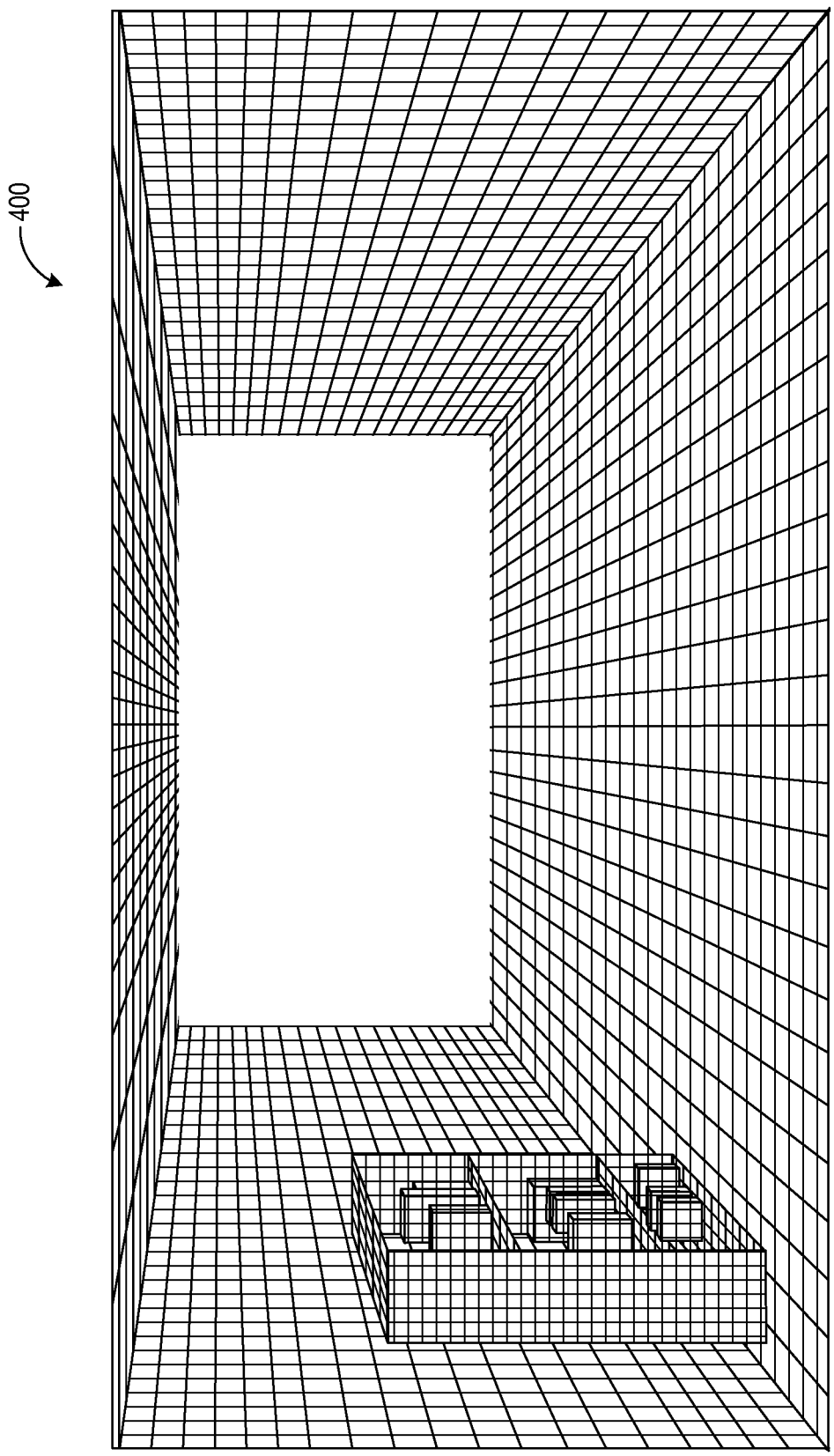
FIG. 4 schematically illustrates the depth data of FIG. 2 after classifying and processing ambiguous data.

Once an ambiguous area of image data has been classified, the pixels of the ambiguous area may be processed accordingly. In the example of FIGS. 1-3, after the contiguous area is classified as "far" rather than "dark," the computing device may be configured to delete the data in the "far" area from the three-dimensional mesh, thereby allowing the area to be constructed as a user with the imaging device moves toward the "far" area. FIG. 4 illustrates a mesh 400 after ambiguous data of mesh 200 has been classified as "far" and removed from the mesh.

Figure 5:
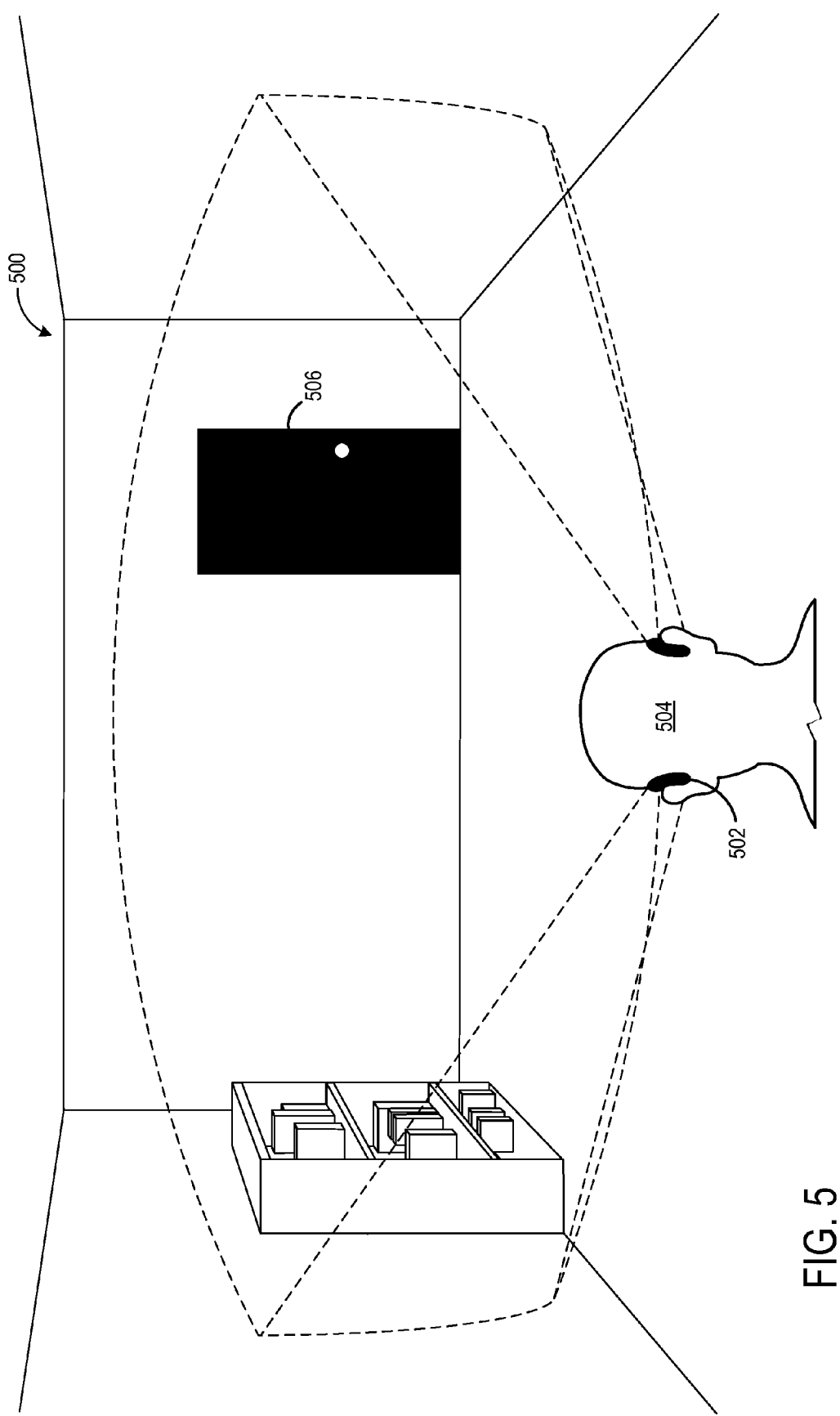
FIG. 5 shows another example depth imaging scenario.
Figure 6:
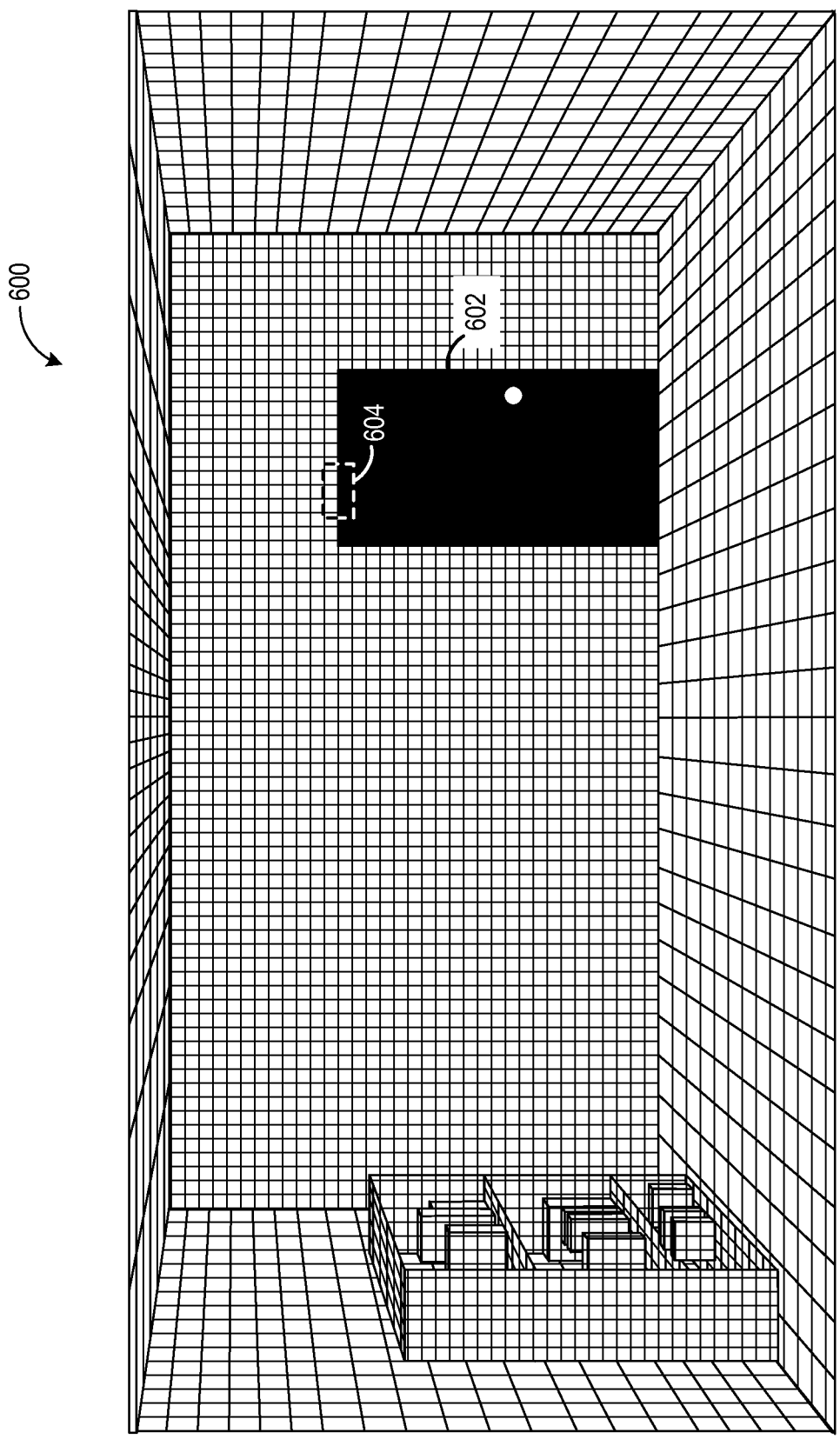
FIG. 6 schematically illustrates example depth data acquired in the scenario of FIG. 5.

In the above examples, if the determined characteristics of the border do not lead to classification of the contiguous area as "far," then the computing device may classify the contiguous area as "dark." FIG. 5 shows an example scenario 500 in which an imaging device 502 worn by a user 504 acquires depth image data of a room with a dark door 506. FIG. 6 shows a schematic of a three-dimensional mesh 600 constructed by a computing device using the depth data acquired in the scenario of FIG. 5. In FIGS. 5 and 6, the depicted door absorbs light of a wavelength utilized for the depth imaging. Thus, pixels of the depth image corresponding to the door may be ambiguous, as a computing device may have difficulty determining that the pixels are "dark" rather than "far."

Figure 7:
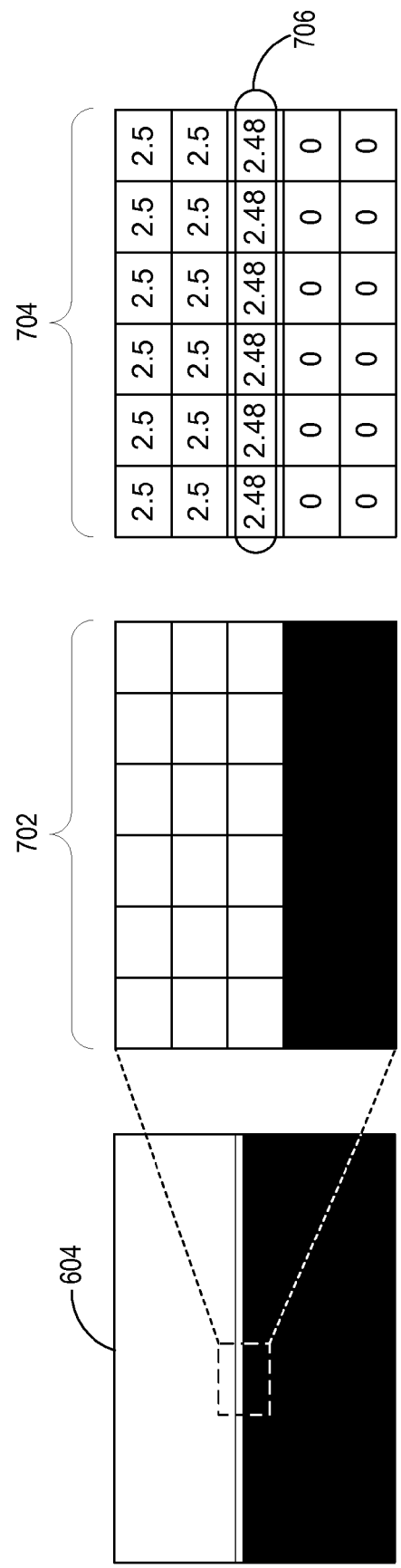
FIG. 7 schematically illustrates an example method of classifying ambiguous data in the depth data of FIG. 6.

To help classify the pixels of the door, pixels in a border region around the ambiguous data may be examined. FIG. 7 illustrates a portion 604 of the three-dimensional mesh 600, and also illustrates a magnified portion 702 schematically representing the pixels of portion 604. FIG. 7 further shows a table 704 representing depth values for each pixel in the magnified portion 702. As with the example of FIGS. 1-4, ambiguous pixels representing the contiguous area of the dark-appearing door are shown as having depth values of zero. To classify the ambiguous pixels, a border 706 of the contiguous area is determined as described above (e.g. using a flood-fill or other suitable method), and the pixels of the border are analyzed. In this example, the depth camera is assumed to have a maximum range of four meters, and the border pixels have depth values of 2.48 meters, outside of a threshold distance of the maximum detectable depth value of four meters. As the border pixels are well outside of the threshold range of the maximum depth value, the computing device may determine that it is more likely that the contiguous area is more likely to be "dark" than "far." Accordingly, in the scenario of FIGS. 5-7, the contiguous area 602 may be classified as "dark." As such, data in a portion of the three-dimensional mesh 600 corresponding to the ambiguous data may be retained instead of deleted from the mesh.

As mentioned above, in some examples, depth gradients adjacent to the border pixels also may be used as data in classifying ambiguous pixels. In the example of FIG. 7, the gradient of the pixels does not show any smooth progression toward the maximum depth value. This may further indicate that the contiguous area is more likely to be "dark" than "far."

Instances may arise where the above methods may misclassify information. For example, if the door in FIGS. 5-7 is open and objects behind the door are outside of the range of the depth camera, the above-described analyses may indicate that the data is "dark" rather than "far." Thus, a computing device may be configured to respond to a "dark" determination in a way that mitigates any potential problems from such a misclassification. For example, as described above, a computing device may remove "far" pixels removal of pixels within that area from a constructed three-dimensional mesh, while not removing "dark" pixels. However, as the pixels in the open door case would likely be classified as "dark" rather than far, the corresponding portion of the depth map (e.g. data previously acquired when the door was closed) would not be deleted. This may help to avoid having to reconstruct portions of a mesh representation of an environment when it is not known with some certainty that the ambiguous area corresponds to "far" data.

Figure 8:
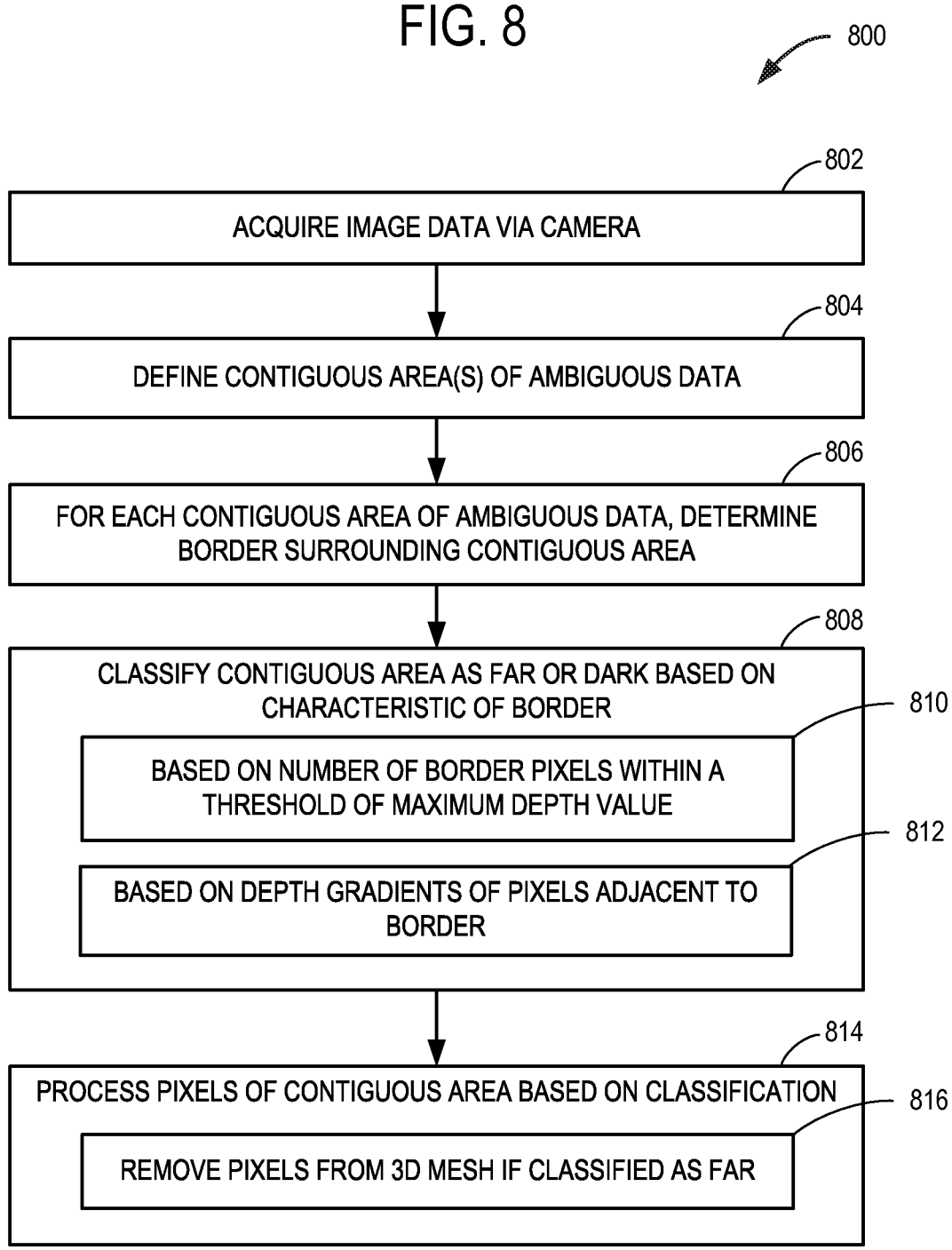
FIG. 8 is a flowchart illustrating an example method of classifying ambiguous image data.

FIG. 8 illustrates an example method 800 for classifying ambiguous data in an image. Method 800 includes, at 802, acquiring image data via a camera. Any suitable type of camera may be utilized, including but not limited to RGB cameras, grayscale cameras, infrared cameras, depth cameras, stereo camera arrangements, etc. Method 800 further includes, at 804, defining one or more contiguous area(s) of ambiguous data. As mentioned above, ambiguity may arise, for example, from uncertainty regarding whether dark-appearing pixels in the image are due to objects at those pixels being beyond the maximum range of a depth camera ("far"), or due to objects at those pixels absorbing light of the wavelength being utilized by the camera ("dark").

Method 800 further includes at 806, for each contiguous area of ambiguous data, determining a border surrounding the contiguous area, and at 808, classifying the contiguous area as "far" or "dark" based on one or more characteristics of the border. As mentioned above, any suitable characteristics of the border pixels may be utilized. In one example, method 810 includes classifying the contiguous area based on a number of border pixels that are within a threshold of a maximum depth value of the camera, as shown at 810. In another example, method 812 includes classifying the contiguous area based on depth gradients of pixels adjacent to the border. Any other suitable characteristics may be used to classify the contiguous area. Likewise, any suitable method may be utilized to locate the border of the ambiguous regions, including but not limited to flood-fill methods.

Once ambiguous pixels have been classified, the pixels may be processed based on the classification, as indicated at 814. As one non-limiting example, method 800 includes removing portions of a constructed three-dimensional mesh corresponding to the pixels if the pixels are classified as far. As another example, a user may provide instruction (e.g. as a preference or other input) regarding how to process the classified area. It will be understood that any other suitable actions may be alternatively or additionally performed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
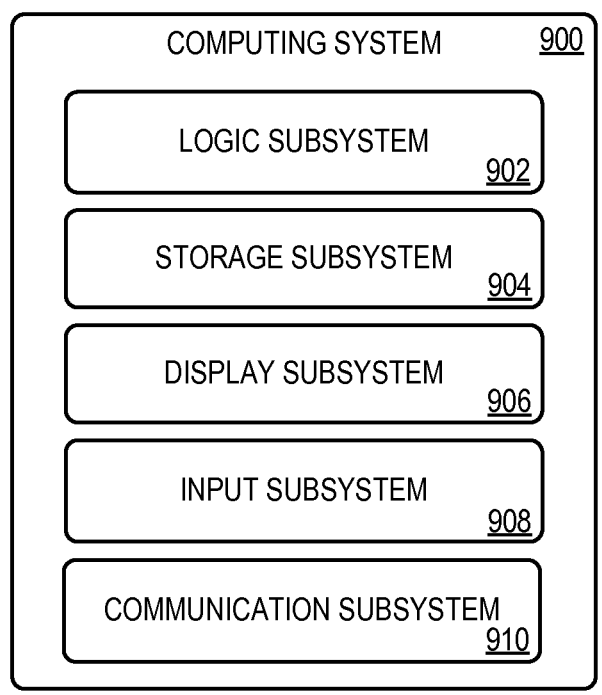
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. For example, computing system 900 may be representative of the imaging device of FIG. 1, and/or a computing device in communication with that of FIG. 1.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 902 may include one or more processors configured to execute software instructions. Additionally or alternatively, the logic machine may include one or more hardware or firmware logic machines configured to execute hardware or firmware instructions. Processors of the logic subsystem 902 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic subsystem 902 may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 900 implemented to perform a particular function. In some cases, a program may be instantiated via logic subsystem 902 executing instructions held by storage subsystem 904. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides, on a computing device, a method of processing image data, the method comprising, defining a contiguous area of ambiguous data in an image, determining a border surrounding the contiguous area, classifying the contiguous area as dark or far based on a characteristic of one or more pixels of the border, and for the classified contiguous area, processing one or more pixels of the contiguous area differently if the contiguous area is classified as far than if the contiguous area is classified as dark. In this example, the image may additionally or alternatively be a depth image. The method may additionally or alternatively include, for each pixel of the border, determining whether the pixel is within a threshold distance of a maximum depth value. The method may additionally or alternatively include classifying the contiguous area as far by determining that a ratio of a number of pixels of the border within the threshold distance of the maximum depth value to a total number of pixels of the border exceeds a threshold ratio. The method may additionally or alternatively include classifying the contiguous area as far by determining that a ratio of a number of pixels of the border within the threshold distance of the maximum depth value to a total number of pixels of the contiguous area exceeds a threshold ratio. The method may additionally or alternatively include calculating a weighted total score based on depth values of pixels of the border compared to the maximum depth value, and classifying the contiguous area as far by determining that the weighted total score exceeds a threshold score. The method may additionally or alternatively include determining depth gradients of pixels adjacent to the border, and classifying the contiguous area as far based on the depth gradients determined. Additionally or alternatively, if the contiguous area is classified as far, the method may include removing the contiguous area from a depth map.

Another example provide a computing system, comprising a depth camera, a logic subsystem, and a storage subsystem comprising instructions executable by the logic subsystem to define a contiguous area of ambiguous data in an image, determine a border surrounding the contiguous area, classify the contiguous area as dark or far based on a characteristic of one or more pixels of the border, and, for the classified contiguous area, process one or more pixels of the contiguous area differently if the contiguous area is classified as far than if the contiguous area is classified as dark. In this example, the depth camera may additionally or alternatively be a time-of-flight depth camera. The computing system may additionally or alternatively be a mobile device. The instructions may additionally or alternatively be executable to, for each pixel of the border, determine whether the pixel is within a threshold distance of a maximum depth value. The instructions may additionally or alternatively be executable to classify the contiguous area as far upon determining that a ratio of a number of pixels of the border within the threshold distance of the maximum depth value to a total number of pixels of the border exceeds a threshold ratio. The instructions may additionally or alternatively be executable to classify the contiguous area as far upon determining that a ratio of a number of pixels of the border within the threshold distance of the maximum depth value to a total number of pixels of the contiguous area exceeds a threshold ratio. The instructions may additionally or alternatively be executable to calculate a weighted total score based on depth values of pixels of the border compared to the maximum depth value, and to classify the contiguous area as far upon determining that the weighted total score exceeds a threshold score. The instructions may additionally or alternatively be executable to determine depth gradients of pixels adjacent to the border, and classify the contiguous area as far based on the depth gradients determined. Additionally or alternatively, if the contiguous area is classified as far, the instructions may additionally or alternatively be executable to remove the contiguous area from a depth map.

Another example provides a computing system, comprising a depth camera, a logic subsystem, and a storage subsystem comprising instructions executable by the logic subsystem to define a contiguous area of ambiguous data in an image, determine a border surrounding the contiguous area, classify the contiguous area as dark or far based on a characteristic of one or more pixels of the border, remove the contiguous area from a depth map if the contiguous area is classified as far, and include the contiguous area in the depth map if the contiguous area is classified as dark. The computing system may additionally or alternatively be a mobile device. The instructions may additionally or alternatively be executable to classify the contiguous area as far based on a number of pixels of the border that are within a threshold distance of a maximum depth value.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of processing image data, the method comprising:
    defining a contiguous area of ambiguous data in an image;
    determining a border surrounding the contiguous area;
    classifying the contiguous area as either dark or far based on a characteristic of one or more pixels of the border; and
    for the classified contiguous area, processing one or more pixels of the contiguous area differently if the contiguous area is classified as far than if the contiguous area is classified as dark.

2. The method of claim 1, wherein the image comprises a depth image.

3. The method of claim 1, further comprising, for each pixel of the border, determining whether the pixel is within a threshold distance of a maximum depth value.

4. The method of claim 3, wherein classifying the contiguous area as far comprises determining that a ratio of a number of pixels of the border within the threshold distance of the maximum depth value to a total number of pixels of the border exceeds a threshold ratio.

5. The method of claim 3, wherein classifying the contiguous area as far comprises determining that a ratio of a number of pixels of the border within the threshold distance of the maximum depth value to a total number of pixels of the contiguous area exceeds a threshold ratio.

6. The method of claim 3, further comprising calculating a weighted total score based on depth values of pixels of the border compared to the maximum depth value, and wherein classifying the contiguous area as far comprises determining that the weighted total score exceeds a threshold score.

7. The method of claim 1, further comprising determining depth gradients of pixels adjacent to the border, and classifying the contiguous area as far based on the depth gradients determined.

8. The method of claim 1, wherein if the contiguous area is classified as far, the method comprises removing the contiguous area from a depth map.

9. A computing system, comprising:
    a depth camera;
    a logic subsystem; and
    a storage subsystem comprising instructions executable by the logic subsystem to
        define a contiguous area of ambiguous data in an image,
        determine a border surrounding the contiguous area,
        classify the contiguous area as either dark or far based on a characteristic of one or more pixels of the border, and
        for the classified contiguous area, process one or more pixels of the contiguous area differently if the contiguous area is classified as far than if the contiguous area is classified as dark.

10. The computing system of claim 9, wherein the depth camera comprises a time-of-flight depth camera.

11. The computing system of claim 9, wherein the computing system comprises a mobile device.

12. The computing system of claim 9, wherein the instructions are further executable to, for each pixel of the border, determine whether the pixel is within a threshold distance of a maximum depth value.

13. The computing system of claim 12, wherein the instructions are further executable to classify the contiguous area as far upon determining that a ratio of a number of pixels of the border within the threshold distance of the maximum depth value to a total number of pixels of the border exceeds a threshold ratio.

14. The computing system of claim 12, wherein the instructions are further executable to classify the contiguous area as far upon determining that a ratio of a number of pixels of the border within the threshold distance of the maximum depth value to a total number of pixels of the contiguous area exceeds a threshold ratio.

15. The computing system of claim 12, wherein the instructions are further executable to calculate a weighted total score based on depth values of pixels of the border compared to the maximum depth value, and to classify the contiguous area as far upon determining that the weighted total score exceeds a threshold score.

16. The computing system of claim 12, wherein the instructions are further executable to determine depth gradients of pixels adjacent to the border, and classify the contiguous area as far based on the depth gradients determined.

17. The computing system of claim 9, wherein if the contiguous area is classified as far, the instructions are further executable to remove the contiguous area from a depth map.

18. A computing system, comprising
    a depth camera;
    a logic subsystem; and
    a storage subsystem comprising instructions executable by the logic subsystem to
        define a contiguous area of ambiguous data in an image;
        determine a border surrounding the contiguous area;
        classify the contiguous area as either dark or far based on a characteristic of one or more pixels of the border;
        remove the contiguous area from a depth map if the contiguous area is classified as far; and
        include the contiguous area in the depth map if the contiguous area is classified as dark.

19. The computing system of claim 18, wherein the computing system comprises a mobile device.

20. The computing system of claim 18, wherein the instructions are further executable to classify the contiguous area as far based on a number of pixels of the border that are within a threshold distance of a maximum depth value.

* * * * *